Nov. 29, 1960     C. L. GUILLAUD ET AL     2,962,444
FERROMAGNETIC CERAMIC MATERIALS
Filed May 22, 1956     4 Sheets-Sheet 3
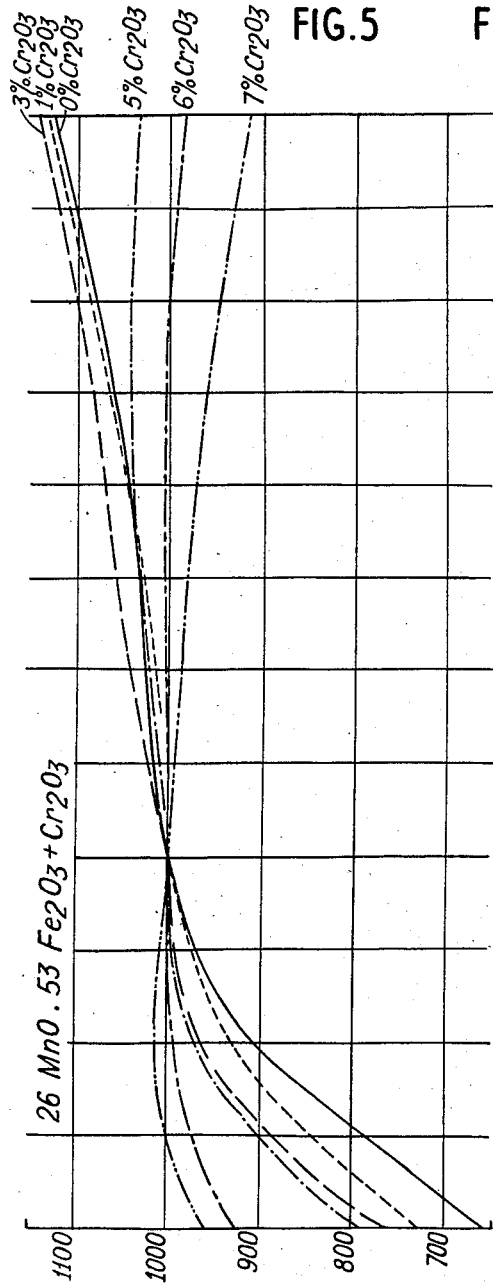
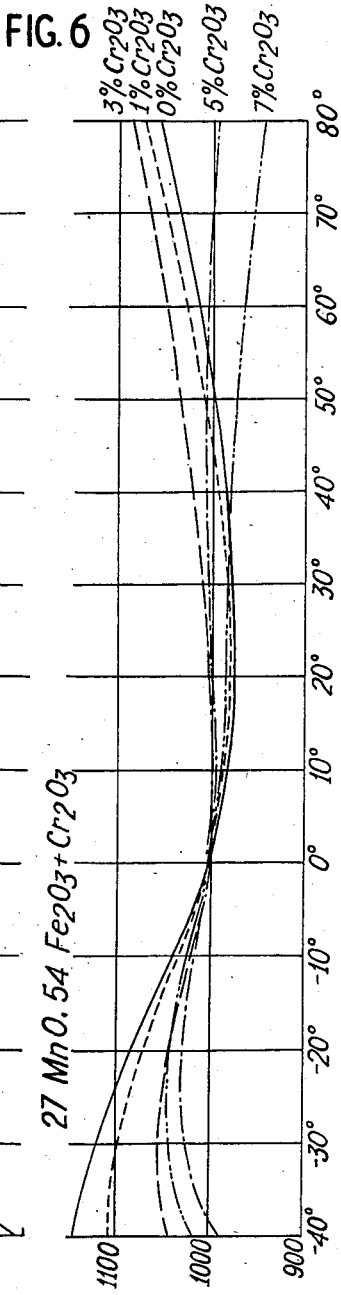
Inventors
C. L. GUILLAUD
A. PIERROT
Y. C. LESCROEL
By
Attorney

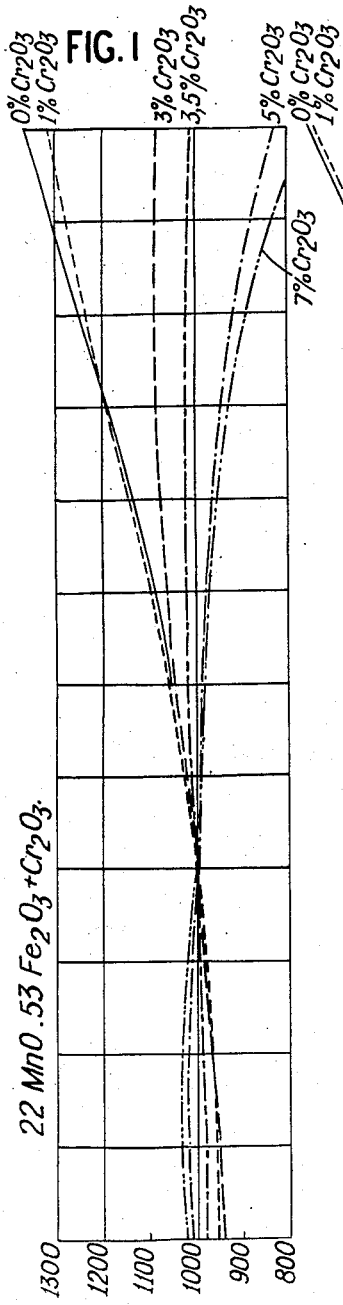
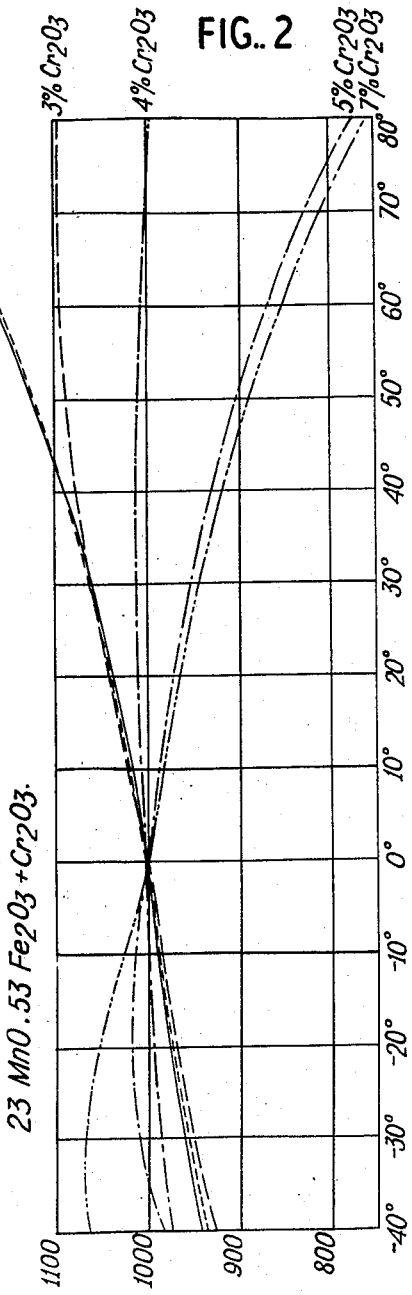

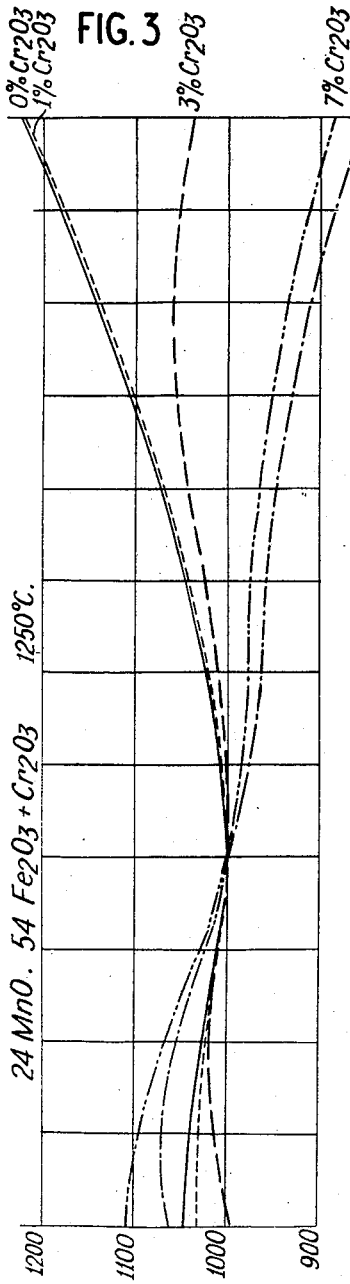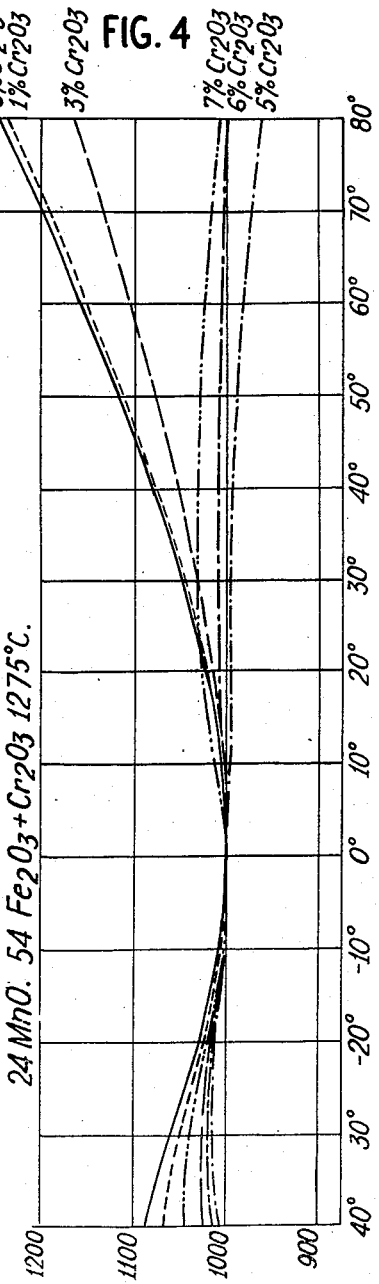

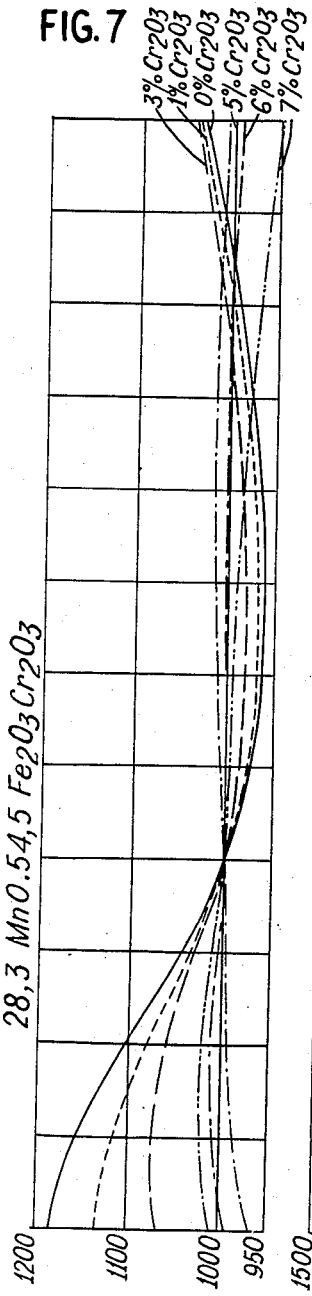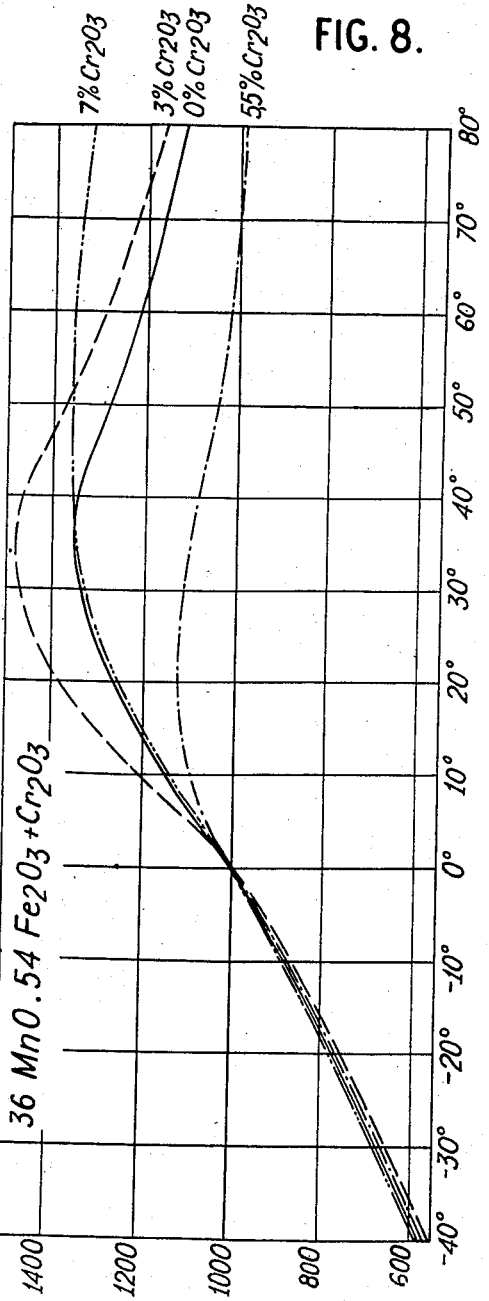

United States Patent Office 2,962,444
Patented Nov. 29, 1960

2,962,444
FERROMAGNETIC CERAMIC MATERIALS

Charles Louis Guillaud, Bellevue, and Andre Pierrot and Yves Charles Lescroel, both of Conflans Sainte-Honorine, France, assignors to Centre National de la Recherche Scientifique, Paris, France, a French government administration Filed May 22, 1956, Ser. No. 586,415

Claims priority, application Belgium Jan. 19, 1956

2 Claims. (Cl. 252—62.5)

This invention relates to ferromagnetic ceramic materials made by pressing and sintering a mixture of metal oxides, and more particularly to such materials having high permeability and low losses, suitable for use as filter coils, transformer cores and the like for high frequency applications, and prepared from mixtures containing an oxide of manganese, zinc oxide and ferric oxide.

The permeability of these materials varies with temperature to a greater or less extent. The extent of variation is conveniently expressed as the temperature coefficient of initial permeability over a given temperature range.

Applicants have described in the specification S.N. 369,823, now U.S. Patent No. 2,886,529, a method of manufacturing ferromagnetic ceramic materials from a mixture of ferric oxide, an oxide of manganese and zinc oxide. The best materials resulting from this method were made from a mixture consisting substantially wholly of those oxides and these last mentioned materials possessed very much higher permeabilities and lower losses than had previously been achieved. For certain practical applications, however, the temperature coefficients of initial permeability of these materials, although not very high between 10° C. and 65° C. are still too great outside that temperature interval.

The object of the present invention is to reduce the temperature coefficient of initial permeability of a material prepared from a mixture composed substantially wholly of ferric oxide, an oxide of manganese and zinc oxide.

According to the present invention the temperature coefficient of initial permeability of such a material is reduced by at least one half by replacement of part of the ferric oxide by chromic oxide.

In this specification the temperature coefficient of initial permeability over a range of temperatures is the difference between the maximum and minimum permeabilities occurring in that range divided by the product of the initial permeability at 0° C. and the difference between the maximum and minimum temperatures of the range and will be expressed in percent per degree centigrade.

It has previously been stated that part of the ferric oxide in a copper zinc ferrite may be replaced by chromic oxide whilst retaining the ferrite crystal structure of the sintered magnetic product.

It is the discovery of the applicants that this replacement in manganese zinc ferrites can lead to a decrease in the temperature coefficient of permeability, and this more particularly over a wide temperature range.

By means of the present invention very small temperature coefficients of initial permeability may be obtained over a temperature range from 0° C. to 80° C. for materials derived from manganese zinc ferrites and for most of such materials over the temperature range from −40° C. to +80° C.

It is to be noted that the materials resulting from the introduction of chromic oxide into the crystal structure are no longer strictly speaking ferrites but are mixed ferrites and chromites.

By carrying out the present invention with a method of preparation as described in the above mentioned prior specification of the applicants the desired reduction of temperature coefficient of initial permeability is obtained without reducing the initial permeability below 800 and without undue losses.

As a measure of the losses the product of the initial permeability of the material at 20° C. by the quality factor Q of the material will be used and will hereinafter be denoted as "quality coefficient" of the material. The quality factor (Q) is the ratio of the reactance of a winding on a toroid (without air gap) of the material to the resistance of the winding due to the losses in the material. The quality factor is determined with a field of the order of 10 millioersteds at 20° C. and at a frequency of 100 kc./s. By undue losses is meant a quality coefficient of the material that is less than 80,000. The present invention can thus be carried out without reducing the quality coefficient of the material below 80,000.

As the properties of a ferromagnetic ceramic material depend upon the final composition it is preferable to express the method according to the invention and the materials obtained by the method in terms of the change in the final composition that is effected.

According to one aspect of the present invention, therefore, a method of reducing the coefficient of ferromagnetic ceramic material composed of substantially 50 mol percent of ferric oxide and the remainder substantially wholly manganous oxide, zinc oxide and ferrous oxide consists in replacing between 2.5 mol percent and 8 mol percent of the said ferric oxide by chromic oxide, the amount of chromic oxide substituted depending upon the manganese content and being such as to reduce the temperature coefficient of initial permeability by at least one half of that of the material without chromic oxide, over a temperature range of −40° C. to +80° C. for materials containing up to 30 mol percent of manganous oxide and over the temperature range 0° C. to +80° C. for materials containing 30 mol percent and upwards of manganous oxide.

By the material being composed substantially wholly of the oxides stated is meant that there is no more than 1.5 percent by weight of any other constituent.

The effects of the substitution of chromic oxide for ferric oxide are (a) a decrease in the permeability, this decrease being greater the greater the proportion of chromic oxide present, (b) an increase in the losses, which increase can be kept small by incorporating in the material a small quantity of calcium oxide which is added to the initial mixture preferably in the form of calcium carbonate to the extent of .01 percent to 1 percent by weight and preferably in 0.2 percent by weight in accordance with patent application 520,877, now U.S. Patent No. 2,903,429, (c) a lowering of the Curie point in almost linear proportion to the amount of chromic oxide (5 mol percent of chromic oxide lowers the Curie point by about 20° C.) (d) a decrease in the temperature coefficient of permeability over a wide range of temperature.

The effect of the replacement of a given molecular proportion of ferric oxide by an equal molecular proportion of chromic oxide on the temperature coefficient of initial permeability depends upon the manganese content as will be seen from the particulars given hereinafter.

Unless stated to the contrary all the examples given hereinafter have been prepared by mixing together the oxides in the molecular proportions given (with the addition of 0.2% by weight of calcium carbonate) by grinding in a mill with steel balls with distilled water for 24 to 48 hours, drying and pressing into toroidal cores at a pressure of 5 metric tons per square centimetre. The iron, manganese or zinc in the starting mixture could, however, be present in another form for example in the form of another oxide or a salt or in metallic form and be converted in the course of preparation into the required oxides.

The initial materials are preferably as pure as possible and impurities containing positive ions having a radius exceeding 1.15 angstrom units should be avoided, such as, potassium, strontium, barium, etc. (The values of the ionic radius to be taken into account are those given in the publication by Goldschmidt: "Geochemische Verteilungsgesetz der Elemente," Skrifer det Norske Videnskaps Akad. Oslo. I. Matem, Naturvid Klasse 1926.) The maximum content of these impurities having an ionic radius greater than 1.15 angstrom units should preferably not exceed 0.2% by weight. The pressed cores are then heated at 1250° C. for a period of 2 to 4 hours with circulation of an atmosphere of nitrogen containing 1% of oxygen and then cooled in pure nitrogen down to room temperature in a period of 8 hours.

The invention will be better understood from the following description taken in conjunction with the accompanying drawings comprising Figs. 1 to 8 in which each figure gives a set of curves showing the variation of initial permeability with temperature of compositions with varying content of chromic oxide $Cr_2O_3$. The compositions given are the compositions before heat treatment. The initial permeability has in each case been reduced to 1000 at 0° C. and the initial permeabilities at other temperatures have been multiplied by the same factor to facilitate comparison.

Referring now to the drawings and first to the curves in Fig. 1, which show the variation with chromic oxide content of initial permeability in the temperature range −40° to +80° C. of ferromagnetic ceramic materials prepared from mixtures containing 22 mol percent MnO, 53 mol percent of the sum of ferric oxide and chromic oxide the remainder being zinc oxide. After heat treatment at 1250° C. in nitrogen containing 1% of oxygen the composition is altered by conversion of some of the ferric oxide into ferrous oxide as described in the specification above referred to. The amount of ferrous oxide formed from a given initial content of ferric oxide by the heat treatment referred to above is found to be substantially unaltered by the presence of chromic oxide.

The magnetic properties of the material having zero chromic oxide content are as follows:

Initial permeability at 0° C.=3100

Temperature coefficient of initial permeability 0.32% per degree centigrade for the temperature range −40° C. to +80° C.

It will be noted from the curves given that the replacement of even as little as 1 mol percent of ferric oxide by a like amount of chromic oxides has reduced the temperature coefficient of permeability over the range above mentioned. With 3 mol percent of chromic oxide and still better with 3.5 mol percent, the improvement in temperature coefficient of permeability is striking. In order to reduce the temperature coefficient to one half of the value without chromic oxide the content of the latter should be at least 2.8 mol percent.

For the material containing 3.5 mol percent of chromic oxide the following properties are obtained:

Initial permeability=2,050
Curie point=103° C.
Quality coefficient of the material=170,000

Temperature coefficient of permeability over the range −40° C. to +80° C.=0.04 per degree centigrade or one tenth of that of the composition without chromic oxide.

The final composition after heat treatment of this last mentioned material is the following: 50.3 mol percent for the sum of ferric oxide and chromic oxide, 3.5 mol percent of ferrous oxide (2.1% in weight), 21.6 mol percent of MnO and the remainder zinc oxide with a very small amount of calcium oxide. Other materials to which the other curves in Fig. 1 relate have practically equivalent contents of ferrous oxide.

With quantities of chromic oxide exceeding 3.5 mol percent the temperature coefficient of permeability changes sign. Up to and including 5 mol percent the absolute value of this coefficient remains at ½ or less of the value without the presence of chromic oxide. For 7 mol percent of chromic oxide there is a sharp decrease in the coefficient at higher temperatures because of approach to the Curie point (85° C.) but between −40° C. and +60° C., the temperature coefficient is still low. For materials prepared from starting compositions containing 22 mol percent MnO and containing molecular percentages of chromic oxide higher than 7, the Curie point becomes too low for the materials to be very useful.

Fig. 2 gives curves on a similar basis to that of Fig. 1 for mixtures which before pressing contain 23 mol percent MnO, 53 mol percent of ferric oxide plus chromic oxide, remainder zinc oxide.

The materials to which this figure relates have substantially the same molecular composition of ferric oxide plus chromic oxide and ferrous oxide as those of Fig. 1.

The material not containing chromic oxide has an initial permeability of 3,200 and a temperature coefficient of initial permeability of 0.26% per degree C. in the interval −40° C. to +80° C.

It will be noted that, as before the inclusion of as little as 1 mol percent chromic oxide leads to a decrease in the temperature coefficient of permeability. Still greater decreases are produced by the inclusion of 3 mol percent and greater decreases still by 4 mol percent chromic oxide. For the last mentioned composition the temperature coefficient of permeability is 0.03% per degree centigrade for the range −40° C. to +80° C., its permeability is 1950 and the quality coefficient of the material=165,000.

A chromic oxide content of 3 mol percent is sufficient to decrease the temperature coefficient of permeability to one half of the value without chromic oxide.

For amounts of chromic oxide greater than 4 mol percent the temperature coefficient of permeability changes sign, but the values remain less than or equal to one half of the value without chromic oxide up to a content of 4.8 mol percent of chromic oxide.

Fig. 3 gives similar curves for mixtures initially containing 24 mol percent MnO, 54 mol percent of the sum of ferric oxide and chromic oxide, remainder zinc oxide.

The material containing no chromic oxide has a temperature coefficient of permeability over the range shown of 0.18% per degree centigrade.

The curves show the influence of 1%, 3%, 5% and 7% ferric oxide content replaced by equivalent contents of chromic oxide. With this MnO content a chromic oxide content of 2.1 mol percent is required to reduce the temperature coefficient to one half of its value without chromic oxide.

For a chromic oxide content of 3 mol percent the temperature coefficient over the range shown is 0.06% per degree C., the permeability is 1500 and the quality coefficient of the material is 210,000.

The curves for 5% and 7% chromic oxide content show somewhat anomalous results; between 3% and 5% chromic oxide content the temperature coefficient increases and for the range 0° to +80° changes sign; for 7% chromic oxide content the temperature coefficient shows a decrease over that for 5% for that range. The temperature coefficient of permeability is decreased to one half the value or less of that of the material without chromic oxide for chromic oxide contents from 2.8 mol percent to 4.2 mol percent without the permeability falling below 800 or the quality coefficient of the material below 80,000.

Fig. 4 shows curves for the same starting composition but heat treated at 1275° C. instead of at 1250° C. to show the effect of different heat treatments.

The magnetic properties of the material without chromic oxide are initial permeability 2,300 temperature coefficient of permeability over the range −60° C. to +80° C.=0.2% per ° C.

In this case a content of chromic oxide of 4 mol percent is sufficient to reduce the temperature coefficient to one half of its value without chromic oxide. The important difference produced by heat treatment at a higher temperature will be noted. In particular it is necessary to increase the chromic oxide content to 6 mol percent to reach the minimum temperature coefficient of permeability.

For this chromic oxide content the final composition is 44.6 mol percent ferric oxide, 5.9 mol percent chromic oxide, 4.6 mol percent ferrous oxide, 23.4 mol percent MnO and the remainder zinc oxide (the content by weight of FeO being 2.8%).

This material has an initial permeability of 1100, a Curie point of 128°, quality coefficient of the material 135,000 and a temperature coefficient of 0.02% per degree C. over the range −40° C. to +80° C.

It will be seen that larger amounts of chromic oxide can be included with advantage in the case of heat treatment at the temperature of 1275° C. than for heat treatment at 1250° C.

The temperature coefficient remains at less than one half of its initial value whilst keeping the permeability at least 800 and the quality coefficient of the material at least 80,000 for contents of chromic oxide up to 8 mol percent.

Fig. 5 gives curves showing the influence of chromic oxide content on the temperature coefficient of permeability for compositions containing initially 26 mol percent MnO, 53 mol percent of the sum of ferric oxide and chromic oxide, remainder zinc oxide. The final composition after heat treatment contains 50.2 mol percent of the sum of ferric oxide and chromic oxide and 3.6 mol percent of ferrous oxide (2.2% by weight), 25.5 mol percent MnO, and the remainder zinc oxide.

The composition with zero content of chromic oxide has an initial permeability of 3,150, and a temperature coefficient of permeability =0.4% per degree C. over the range −40° C. or +80° C. It will be noted that this temperature coefficient is exceptionally high in the range −40° C. to 0° C. The addition of small amounts of chromic oxide (up to 3 mol percent) has the effect of slightly increasing this temperature coefficient for the range 0° C. to +80° C. but gives overall improvement for the full temperature range of −40° to +80° C. A composition containing initially 6% of chromic oxide has an initial permeability of 1350, a Curie point of 129° C., a quality coefficient of the material 203,000 and a temperature coefficient of initial permeability 0.07% per degree for the range −40° C. to +80° C.

A content of 5 mol percent chromic oxide reduces the temperature coefficient to one half of its value without chromic oxide.

The chromic oxide content can be increased to 8 mol percent whilst still keeping initial permeability not less than 800, the quality coefficient of the core material not less than 80,000 and temperature coefficient not greater than one half of its value without chromic oxide.

Fig. 6 shows similar curves for a composition containing initially 54 mol percent of the sum of ferric oxide and chromic oxide, 27 mol percent of MnO, and the remainder ZnO. The composition without chromic oxide has a temperature coefficient of initial permeability of 0.15% per degree C. and a chromic oxide content of 5 mol percent gives the minimum value of 0.03% per degree C. The temperature coefficient remains below one half of the value without chromic oxide for contents of the latter between 3 and 6.5 mol percent without the permeability falling below 800 or the quality coefficient of the core material falling below 80,000.

Fig. 7 shows similar curves for an initial composition containing 28.3 mol percent MnO, 54.5 mol percent of the sum of ferric oxide and chromic oxide.

The composition after heat treatment is substantially as follows 50.3 mol percent of the sum of ferric oxide and chromic oxide, 27.5 mol percent MnO, 5.4 mol percent ferrous oxide (3.3% by weight) remainder ZnO.

The material without chromic oxide has a temperature coefficient of initial permeability of 0.18% per degree centigrade and initial permeability of 1600.

For an initial composition containing 6 mol percent of chromic oxide the initial permeability is 920, the quality coefficient of the material 204,000 and the temperature coefficient of permeability is 0.02% per degree C., over the range −40° C. to +80° C.

A chromic oxide content of 2.5 mol percent reduces the temperature coefficient to one half of its initial value and the chromic oxide content can be increased to 7.5 mol percent whilst still keeping this temperature coefficient not exceeding one half of its initial value and not taking the permeability below 800 or the quality coefficient of the core material below 80,000.

For compositions containing more than 30 mol percent MnO the temperature coefficient is generally high over the full range from −40° C. to +80° C. and cannot be reduced to below 0.15% per degree C. over that range by the addition of chromic oxide. This is illustrated by Fig. 8 which shows curves, similar to those in the other figures, for an initial composition containing 36 mol percent MnO, 54 mol percent of the sum of ferric oxide and chromic oxide. It will be seen that the replacement of ferric oxide by chromic oxide has very little effect over the range −40° C. to 0° C. For the range 0° C. to +80° C., however, a considerable effect can be seen to be produced on the temperature coefficient of initial permeability, though the results are somewhat anomalous as compared with those obtained with compositions containing less than 30 mol percent MnO. The presence of 3 mol percent chromic oxide worsens the temperature coefficient but 5.5 mol percent of chromic oxide considerably improves it. For the composition not containing chromic oxide the temperature coefficient of initial permeability is 0.40% per dgeree C. between 0° C. and +80° C. The composition containing 5.5 mol percent chromic oxide has a final molecular composition of 45.1 mol percent ferric oxide, 5.4 mol percent chromic oxide, 4.6 mol percent ferrous oxide (2.8% by weight) 35.2 mol percent MnO and the remainder zinc oxide. The initial permeability is 1500 the quality coefficient of the material is 270,000 and the temperature coefficient of initial permeability is 0.15% per degree C. for the range 0° C. to +80° C. For chromic oxide contents between 4.8% and 6.3% the temperature coefficient of permeability is better than one half of the value without chromic oxide and permeabilities are greater than 800 and the quality coefficient of the material better than 80,000.

It may be noted from the specification above referred to (S.N. 369,823) that the magnetic properties of ferromagnetic ceramic materials prepared from mixtures containing an oxide of manganese, ferric oxide and zinc oxide may show wide variation even with a constant manganese oxide content of the starting composition in accordance with the original content of ferric oxide. The following example is therefore given for comparison with the results given above in relation to Fig. 7. A starting composition of 47.5 mol percent of ferric oxide, 5 mol percent of chromic oxide, 28.3 mol percent of MnO and the remainder zinc oxide gives after heat treatment a molecular composition of 45.4% ferric oxide, 4.9% chromic oxide, 2.6% ferrous oxide, 27.9% MnO and the remainder zinc oxide. This material has an initial permeability of 2000, a quality coefficient of the material of 280,000 and a temperature coefficient of initial permeability for the temperature range −40° C. to +80° C. of 0.2% per degree C. as compared with a material having zero chromic oxide content of 0.4% per degree C.

The invention has been described above in relation to ferromagnetic ceramic materials (commonly called manganese zinc ferrites) prepared by heating in an atmosphere of nitrogen containing a small amount of oxygen. By this heat treatment and by proportioning correctly the ferric oxide content of the original mixture the highest magnetic properties are obtained.

When an appreciable quantity of chromic oxide is introduced into the starting composition the material is no longer strictly speaking a ferrite.

What we claim is:

1. A ferromagnetic ceramic material composed substantially wholly of manganous oxide from 21.6 mol percent to 36 mol percent, chromic oxide from 2.5 mol percent to 8 mol percent, the molecular proportion of the sum of ferric oxide and chromic oxide being between 49.7 and 51 mol percent, ferrous oxide between 0.1 and 6 mol percent and the remainder zinc oxide, the material being made by mixing and heat-treating said oxides in substantially an inert atmosphere containing a small percentage of oxygen, the heat treatment period being sufficient to convert between 0.1 and 6 mol percent of ferric oxide to ferrous oxide, said material having a temperature coefficient of initial magnetic permeability less than .2% in the temperature range between −40° C. and +80° C., an initial permeability greater than 800 and a quality coefficient greater than 80,000.

2. A ferromagnetic ceramic material composed substantially wholly of manganous oxide from 21.6 mol percent to 36 mol percent, chromic oxide from 2.5 mol percent to 8 mol percent, the molecular proportion of the sum of the ferric oxide and chromic oxide being between 49.7 and 51 mol percent, ferrous oxide between 0.1 and 6 mol percent, and the remainder zinc oxide, said material being made by mixing manganese oxide, chromium oxide, ferric oxide, zinc oxide and approximately .02% by weight of calcium carbonate, and heat treating said mixture in substantially an inert atmosphere containing a small percentage of oxygen, the heat treatment period being sufficient to convert between 0.1 and 6 mol percent of ferric oxide to ferrous oxide.

References Cited in the file of this patent

UNITED STATES PATENTS

| | | |
|---|---|---|
| 2,551,711 | Snoek | May 8, 1951 |
| 2,579,267 | Leverenz et al. | Dec. 18, 1951 |
| 2,736,708 | Crowley | Feb. 28, 1956 |

FOREIGN PATENTS

| | | |
|---|---|---|
| 524,097 | Belgium | Nov. 30, 1953 |
| 1,074,864 | France | Apr. 7, 1954 |
| 1,093,965 | France | Dec. 1, 1954 |
| 1,107,654 | France | Aug. 10, 1955 |
| 1,110,334 | France | Oct. 12, 1955 |

OTHER REFERENCES

Gorter: Philips Research Reports, vol. 9, No. 6, pp. 419–427, 438–442, December 1954.